(12) United States Patent
Liikanen et al.

(10) Patent No.: US 11,983,065 B2
(45) Date of Patent: *May 14, 2024

(54) LOGIC BASED READ SAMPLE OFFSET IN A MEMORY SUB-SYSTEM

(71) Applicant: Micron Technology, Inc., Boise, ID (US)

(72) Inventors: Bruce A. Liikanen, Berthoud, CO (US); Michael Sheperek, Longmont, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/445,395

(22) Filed: Aug. 18, 2021

(65) Prior Publication Data

US 2021/0382786 A1 Dec. 9, 2021

Related U.S. Application Data

(63) Continuation of application No. 16/507,500, filed on Jul. 10, 2019, now Pat. No. 11,119,848.

(51) Int. Cl.
*G06F 11/10* (2006.01)
*G06F 3/06* (2006.01)

(52) U.S. Cl.
CPC ........ *G06F 11/1048* (2013.01); *G06F 3/0619* (2013.01); *G06F 3/0658* (2013.01); *G06F 3/0683* (2013.01)

(58) Field of Classification Search
CPC .. G06F 11/1048; G06F 3/0619; G06F 3/0658; G06F 3/0683; G06F 3/064; G06F 3/0679; G06F 3/0688
USPC ....................................................... 714/763
See application file for complete search history.

(56) References Cited

U.S. PATENT DOCUMENTS

| | | | |
|---|---|---|---|
| 8,099,652 B1 | 1/2012 | Alrod et al. | |
| 8,499,227 B2 | 7/2013 | Liikanen et al. | |
| 8,510,636 B2 | 8/2013 | Ruby et al. | |
| 8,542,561 B1 | 9/2013 | Oberg | |
| 8,862,969 B2 | 10/2014 | Liikanen et al. | |
| 8,923,062 B1 * | 12/2014 | Lee | G11C 16/3404 365/174 |
| 9,070,479 B2 | 6/2015 | Sharon et al. | |
| 10,140,040 B1 | 11/2018 | Koudele et al. | |
| 10,402,272 B2 | 9/2019 | Liikanen et al. | |

(Continued)

*Primary Examiner* — James C Kerveros
(74) *Attorney, Agent, or Firm* — Lowenstein Sandler LLP (57) ABSTRACT

The present disclosure is directed to logic based read sample offset operations in a memory sub-system. A processing device performs a first read, a second read, and a third read of data from a memory devices using a first center value corresponding to a first read level threshold, a negative offset value, and a positive offset value, respectively. The processing device performs a XOR operation on results from the first and second reads to obtain a first value and a XOR operation on results from the second and third reads to obtain a second value. The processing device performs a first count operation on the first value to determine a first difference bit count and a second count operation on the second value to determine a second difference bit count. The processing device can store or output the first difference bit count and the second difference bit count.

24 Claims, 7 Drawing Sheets

(56) References Cited

U.S. PATENT DOCUMENTS

| | | |
|---|---|---|
| 10,629,278 B2 | 4/2020 | Sheperek et al. |
| 2008/0137416 A1 | 6/2008 | Lee |
| 2009/0310421 A1 | 12/2009 | Cernea |
| 2012/0317380 A1 | 12/2012 | Agrawal et al. |
| 2013/0185612 A1 | 7/2013 | Lee et al. |
| 2013/0308381 A1 | 11/2013 | Alrod et al. |
| 2014/0281769 A1 | 9/2014 | Ohshima |
| 2016/0118131 A1 | 4/2016 | Dong et al. |
| 2017/0123905 A1 | 5/2017 | Zhu et al. |
| 2018/0173432 A1* | 6/2018 | Han .................. G06F 3/0658 |
| 2018/0341416 A1 | 11/2018 | Koudele et al. |
| 2018/0341553 A1 | 11/2018 | Koudele et al. |
| 2018/0350441 A1* | 12/2018 | Kim ................. G06F 11/1012 |
| 2019/0088340 A1 | 3/2019 | Shirakawa |
| 2019/0096490 A1 | 3/2019 | Madraswala et al. |
| 2019/0102084 A1* | 4/2019 | Zhang ............... G11C 11/5642 |
| 2019/0279724 A1 | 9/2019 | Itoh et al. |
| 2019/0303236 A1* | 10/2019 | Ellis .................... G06F 3/065 |
| 2020/0035306 A1 | 1/2020 | Lin et al. |
| 2020/0090766 A1 | 3/2020 | Tokutomi et al. |
| 2020/0104209 A1 | 4/2020 | El Gamal et al. |
| 2020/0110660 A1* | 4/2020 | Cariello ............ G06F 11/1068 |
| 2020/0133679 A1* | 4/2020 | Brandt .............. G06F 9/30101 |
| 2020/0176066 A1 | 6/2020 | Her et al. |
| 2020/0394105 A1 | 12/2020 | Tao et al. |

* cited by examiner

FIG. 7 even quality level of the reports to the memory sub-system; however, it introduces a new term to perform a read sample offset in a memory sub-system with errors.

LOGIC BASED READ SAMPLE OFFSET IN A MEMORY SUB-SYSTEM

RELATED APPLICATION

This is a continuation of U.S. patent application Ser. No. 16/507,500, filed Jul. 10, 2019, which is hereby incorporated in its entirety herein by reference.

TECHNICAL FIELD

Embodiments of the disclosure relate generally to memory sub-systems, and more specifically, relate to logic based read sample offset in a memory sub-system.

BACKGROUND

A memory sub-system can be a storage system, a memory module, or a hybrid of a storage device and memory module. The memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to logic based read sample offset in a memory sub-system. The logic includes exclusive or (XOR) operations. A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components. The host system can provide data to be stored at the memory sub-system and can request data to be retrieved from the memory sub-system.

The memory sub-system can include multiple memory devices that can store data from the host system. Conventional memory sub-systems use an Error Correction Code (ECC) decoder to detect and correct a limited number of errors in data read from the memory devices. ECC decoders have a correction capability that indicates that the ECC decoder cannot correct more than a specified number of bit errors present in data read from the memory devices. Parity information can be used to correct errors, but the parity information limits the number of errors that can be corrected.

A conventional memory sub-system can perform a read sample offset (RSO) operation in which multiple read operations are performed to sample data at varying offsets, generally referred to as left, right, and center samples. Each of these read operations is of the same data. The conventional memory sub-system can use the multiple read samples to compute a difference error count (DiffEC). The difference error count can be used to determine other metrics, such as a valley depth or a relative Read Window Budget (RWB), as described below. It should be noted that a single center sample may not be enough to equalize the bit error rate (BER) between page types, but the multiple samples can be used to determine the difference error count, which can be enough to equalize the BER between page types. As noted above, to perform the RSO operation, the memory sub-system performs multiple read operation of the same data and uses the ECC decoder to determine the difference error count between these samples. Thus, the conventional memory sub-systems are dependent on ECC to perform RSO operations and the RSO operations are limited by the correction capability of the ECC decoder.

Aspects of the present disclosure address the above and other deficiencies by performing logic based read sample offset operations, such as a read sample offset exclusive-or (RSOXOR) operation. That is, a simple logic operation, such as XOR operation, can be used to determine difference bit counts without the need of an ECC decoder as done conventionally for the RSO operation. Since each of the read operations in the read sample offset are of the same data, an XOR operation of the data bits between any two of the read operations will result in the bit value of 1 for any bit that is different. All bits that have the same value results in a 0. Counting the number of 1s from the XOR operation indicates a number of bits that have been changed between the two read operations. When using the center read as a point of reference, performing an XOR operation between the center sample and the left sample results in one number of bit differences (referred to herein as left difference bit count (left DBC)) and performing an XOR operation between the center sample and the right sample results in another number of bit differences (referred to herein as right DBC). A memory device (e.g., NAND memory device) can include a local media controller. In one embodiment, the local media controller (e.g., NAND controller) on the memory device performs the XOR function and counting function, and provides a result to the memory sub-system controller. In one embodiment, the XOR and counting functions (e.g., sum( )) are performed by a memory-subsystem controller (e.g., solid-state device (SSD) controller). The local media controller of the memory device can provide the data from each of the left, right, and center reads to the memory sub-system controller, and the memory sub-system controller performs the XOR function and the counting function. In another embodiment, the local media controller of the memory device performs the XOR function and provides a result the memory sub-system controller, and the memory sub-system controller uses the result to perform the counting function.

In some embodiments, the read sample offset XOR operation is performed on multiple read level thresholds concurrently or simultaneously. For example, all read level thresholds used for a page type can be read with zero offset, left offset, and right offset concurrently, rather than a single read level threshold at a time. When all the read level thresholds are offset concurrently, the difference bit counts represent bit changes from a sum of all thresholds in a page type. It should be noted that although various embodiments described herein set forth that the XOR and counting functions can be split between the memory sub-system controller and the local media controller on the media device, in other embodiments, the operations (e.g., XOR and counting functions) can be split between a memory-subsystem controller (e.g., SSD controller) of the memory sub-system and the host system.

Advantages of the present disclosure include, but are not limited to, an improved system in which the difference bit counts can be determined without the need of an ECC decoder as done conventionally. Aspects of the present disclosure also provide a system, where the XOR operation can be designed as a simple logic operation in one or more memory devices (e.g., NAND components) of the memory sub-system. Determining the difference bit counts at the local media controller on the memory device, for example, can enable many additional operations without the need to send data from the media controller to a memory sub-system controller for ECC decoding. For example, the additional operations may include a continuous read level calibration (cRLC), a dynamic program targeting (DPT), or the like, without sending data from the media controller to the memory sub-system controller for ECC decoding. For another example, the difference bit counts can be determined at the memory devices (e.g., NAND devices) and provided to the memory sub-system controller (e.g., SSD controller) to perform additional operations based on the difference bit counts. In addition, another advantage of the present disclosure includes, but is not limited to, an improved system in which the difference bit counts can be determined even when the number of bit errors exceeds the correction capacity of the ECC decoder.

Figure 1:
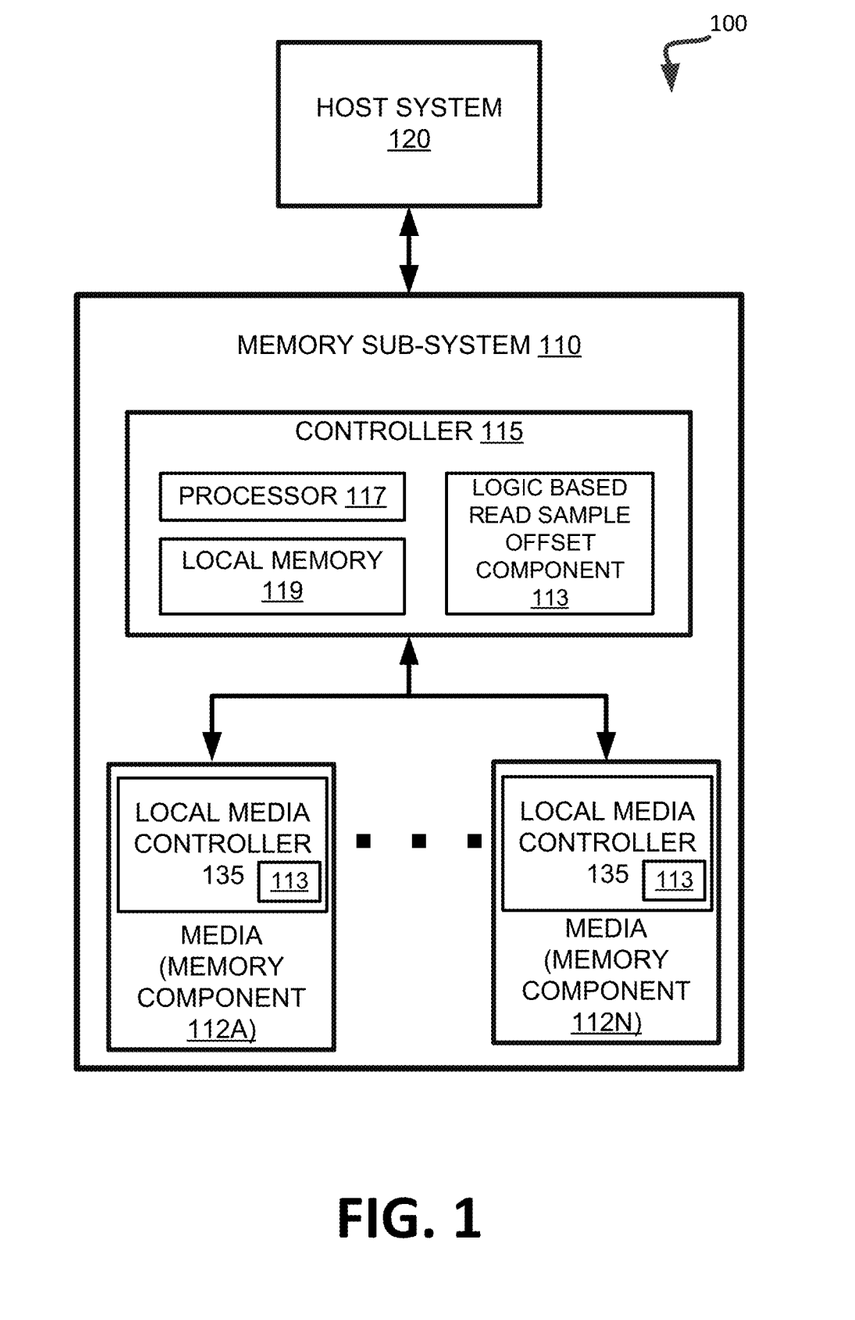
FIG. 1 illustrates an example computing environment that includes a memory sub-system in accordance with some embodiments of the present disclosure.

FIG. 1 illustrates an example computing environment 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

An example of non-volatile memory devices (e.g., memory device 130) includes a negative-and (NAND) type flash memory. Each of the memory devices 130 can include one or more arrays of memory cells such as single level cells (SLCs) or multi-level cells (MLCs) (e.g., triple level cells (TLCs) or quad-level cells (QLCs)). In some embodiments, a particular memory component can include an SLC portion, and an MLC portion, a TLC portion, or a QLC portion of memory cells. Each of the memory cells can store one or more bits of data used by the host system 120. Furthermore, the memory cells of the memory devices 130 can be grouped as memory pages or memory blocks that can refer to a unit of the memory component used to store data.

Although non-volatile memory components such as NAND type flash memory are described, the memory device 130 can be based on any other type of non-volatile memory, such as read-only memory (ROM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 may not include a memory sub-system controller 115, and may instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

The memory sub-system 110 includes a logic based read sample offset component 113 that can determine bit difference counts without the need of an ECC decoder. In some embodiments, the memory sub-system controller 115 includes at least a portion of the logic based read sample offset component 113. The memory sub-system controller 115 can include a processor 117 (processing device) configured to execute instructions stored in local memory 119 for performing the operations described herein. Alternatively, the memory sub-system controller 115 includes circuits to implement the operations described herein.

The logic based read sample offset component 113 can perform a sampling where a single read level threshold is offset from a center value to a lower offset value where the page is read, representing the left read sample, and then offset again to a higher offset value where the page is read again, representing the right read sample. The center read sample is a read performed with zero offset. By performing a XOR operation between the center read sample and the left read sample and performing a XOR operation between the center read sample and the right read sample results in a first value and a second value, respectively. That is, the raw data of 1s and 0s from the two read samples is XOR'd and the number of 1s from the XOR operation is counted to produce a difference bit count (DBC). The number of 1s in the first value indicates a number of bit changes between the center read sample and the left read sample. The number of 1s in the second value indicates a number of bit changes between the center read sample and the right read sample. The following equations show the left DBC and the right DBC:

LeftDifferenceBitCount(LBC)=sum(Center XOR Left)

RighttDifferenceBitCount(RBC)=sum(Center XOR Right)

multiple reads to sample and can perform a first XOR operation on results from a first read and results from a second read to obtain a first value and a second XOR operation on the results from the first read and results of a third read to obtain a second value. The logic based read sample offset component 113 can perform a first count operation on the first value to determine a first difference bit count and a second count operation on the second value to determine a second difference bit count. The logic based read sample offset component 113 can report the left and right difference bit counts, such as by storing the difference bit counts, outputting the difference bit counts to the host system 120, or the like. The first count operation can count a number of ones in the first value resulting from the first XOR operation. The number of ones in the first value indicates a number of bits that have changed between the first read and the second read. The second count operation can count a number of ones in the second value resulting from the second XOR operation. The number of ones in the second value indicates a number of bits that have changed between the first read and the third read.

In one embodiment, the logic based read sample offset component 113 includes a logic circuit to perform the first XOR operation and the second XOR operation. In another embodiment, the logic based read sample offset component 113 includes a first logic circuit to perform the first XOR operation and a second logic circuit to perform the second XOR operation.

As described herein, in some embodiments, the memory devices 130 include local media controllers 135 that operate in conjunction with memory sub-system controller 115 to execute operations on one or more memory cells of the memory devices 130. In some embodiments, the local media controllers 135 include the logic based read sample offset component 113. In these embodiments, the logic based read sample offset component 113 of the local memory controller 135 can perform the operations described herein, such as the XOR operation, the counting operation, or both. Alternatively, the operations (e.g., XOR and counting functions) can be split between the memory sub-system controller 115 and the local media controllers 135 of the individual memory devices 112A-112N of the memory sub-system 110.

The memory sub-system controller 115 can include an ECC decoder. In some embodiments, the local media controller 135 of the memory devices 130 can determine the first difference bit count and the second difference bit count without sending the results from the first read, the second read, and the third read to the ECC decoder of the memory sub-system controller 135. The local media controller 125 of the memory devices 130 can provide the first difference bit count and the second difference bit count to the memory sub-system controller 135, and the memory sub-system controller 135 can perform a cRLC operation using the first difference bit count and the second difference bit count. A cRLC operation is a read level calibration that is done for each of the multiple read level threshold registers being used during read operation. The cRLC operation is done to keep each threshold center, so that the memory sub-system obtains the best overall BER The calibration is referred to as continuous because the algorithm samples (each sample is a set of multiple reads such as center, left, and right), continually at discrete intervals. As noted herein, the first difference bit count can now exceed a correction capability of the ECC decoder. Similarly, the second difference bit count can now exceed the correction capability of the ECC decoder.

In a further embodiment, the logic based read sample offset component 113 performs a fourth read of second data from the one or more memory components 112A to 112N using a second center value corresponding to a second read level threshold, a fifth read of the second data using a second negative offset that is lower than the second center value, and a sixth read of the second data using a second positive offset that is higher than the second center value. The logic based read sample offset component 113 performs a third XOR operation on results from the fourth read and results from the fifth read to obtain a third value and a fourth XOR operation on the results from the fourth read and results of the sixth read to obtain a fourth value. The logic based read sample offset component 113 can perform a third count operation on the third value to determine a third difference bit count and a fourth count operation on the fourth value to determine a fourth difference bit count. The logic based read sample offset component 113 can log the third difference bit count and the fourth difference bit count operation. For example, the logic based read sample offset component 113 can send the first difference bit count and the second difference bit count to the host system 120 over an interconnect between the memory sub-system 110 and the host system 120. For another example, the logic based read sample offset component 113 in a memory component can send the first difference bit count and the second difference bit count to the memory sub-system controller 115 of the memory sub-system 110. In some embodiment, the first read and the fourth read are performed concurrently (or simultaneously). Similarly, the second read and the fifth read are performed concurrently and the third read and the sixth read are performed concurrently. The first read level threshold and the second read level threshold can correspond to a same page type. In another embodiment, the logic based read sample offset component 113 performs operations to produce a five sample set of difference bit counts, such as illustrated and described with respect to FIG. 2.

In other embodiments, the logic based read sample offset component 113 uses a RSO mask register to mask one or more read level thresholds of a page type and disable the first read level threshold. The first read, the second read, and the third read are part of a RSO page read from a page that provides three-strobe results with bit error rate (BER) differences limited to the first read level threshold. For example, the RSO mask register bits can be an X (i.e., don't care), 1, or 0, where the 0 is set for strobed thresholds for the page type, X is set for non-strobed thresholds, and where the 1 is set for the desired read level threshold(s) of the page type being read. Where multiple read level thresholds are being tested, the RSO mask register can be used to mask one or more read level thresholds of a page type and disable a first read level threshold and a second read level threshold. The first read, the second read, and the third read are part of a RSO page read from a page that provides three-strobe results BER differences limited to the first read level threshold and the second read level threshold. An example of a RSOXOR operation with a TLC read XP with mask set on for RL5 valley 5 is illustrated and described below with respect to FIG. 2.

In some embodiments, the host system 120 can include a portion of the logic based read sample offset component 113, such as described herein, where the XOR functions or the counting functions can be performed at the host system 120.

Figure 2:
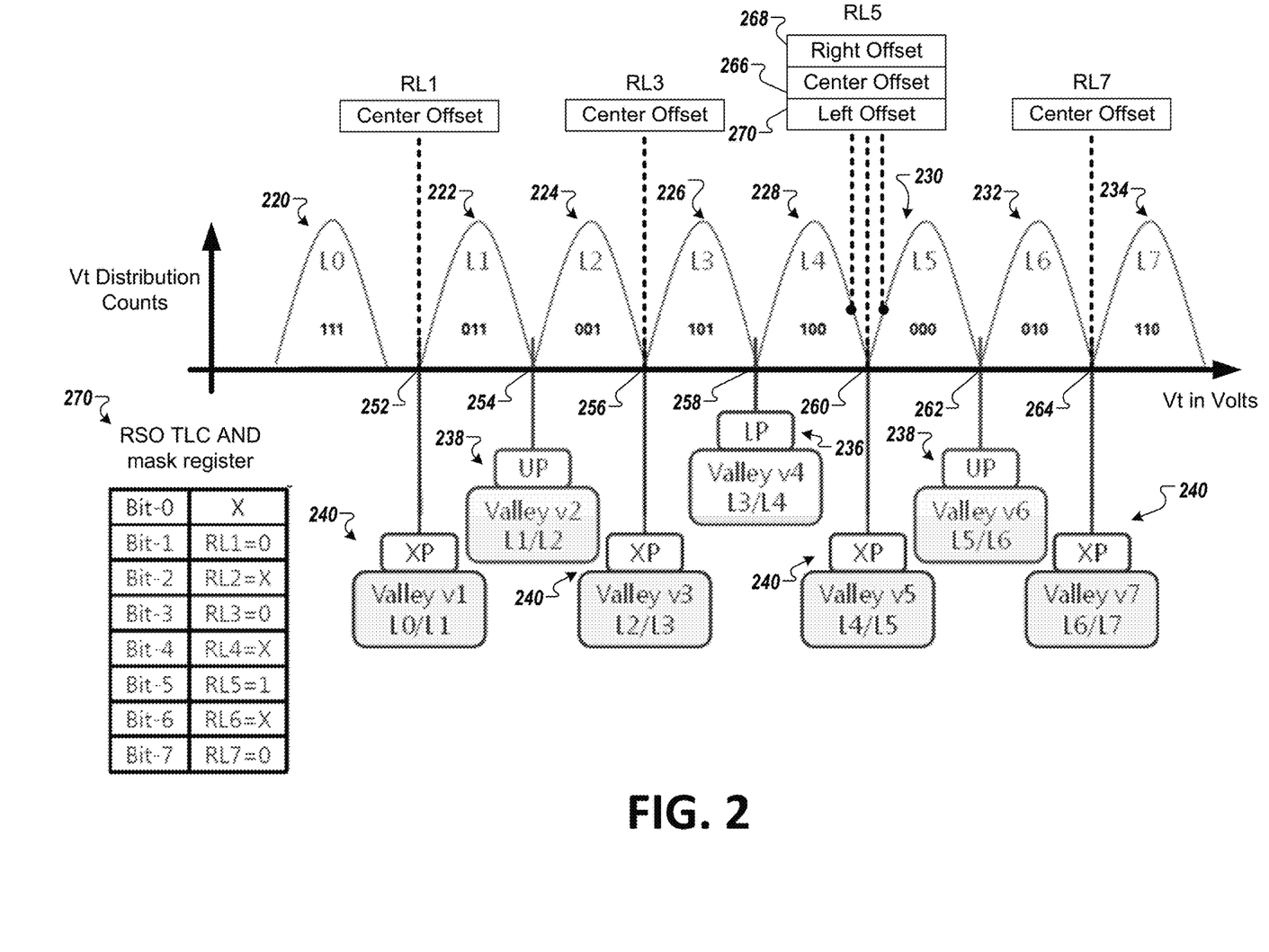
FIG. 2 illustrates a read sample offset with a mask set for a read level threshold between two programming distributions of a TLC memory cell with eight programming distributions, in accordance with some embodiments of the present disclosure.

FIG. 2 illustrates a read sample offset with a mask set for a read level threshold between two programming distributions of a TLC memory cell with eight programming distributions, in accordance with some embodiments of the present disclosure. A memory block with TLC memory cells stores TLC information using 3 bits of data per cell. As illustrated in FIG. 2, this is accomplished using eight programming distributions 220-234. A lower page (LP) is defined with one read level threshold 236. An upper page (UP) is defined with two read level thresholds 238. An extra page (XP) is defined with fourth read level thresholds 240. The eight programming distributions 220-234 each correspond to a level (L0:L7), each level corresponding to a code (000b:111b). Between each pair of eight programming distributions is a valley, totally seven valleys (v1:v7). A center of each programming distribution 220-234 corresponds to a PV target for the respective programming distribution 220-232. In total, there can be seven PV targets and 7 read level thresholds 252-264.

A RSO TLC AND mask register 270 can be eight bits, where Bits 1-7 corresponding to the read level thresholds RL1-RL7, respectively. As illustrated in FIG. 2, the mask register 270 stores 0s for Bit-1, Bit-3, and Bit-7, corresponding to the first read level threshold RL1 252, the third read level threshold RL3 256, and seventh read level threshold RL7 264 for an extra page (XP) type. The mask register 270 stores Xs for Bit-2, Bit-4, and Bit-6 corresponding to the non-strobed read level thresholds for the XP page type. The mask register 270 stores a 1 for Bit-5 corresponding to the fifth read level threshold RL5 260 to extract the difference bit counts for valley 5 on the extra page. In essence, the RSO TLC mask register bits mask RL1, RL3, and RL7 and disabled for RL5. The ROS TLC page read from the XP will provide the 3-strobe results with BER differences limited to the RL5 contribution. In one implementation, one read command, e.g., ONFi read command, can return the 3 read samples. In this example, it should be noted that there are 4 strobes for each of the 3 reads in the RSO sample. In the first read operation, all strobes are at the center offset. In the second read operation, RL1, RL3, and RL7 are at the center offset and RL5 is at the lower threshold. In the third read operation, RL1, RL3, and RL7 are at the center offset and RL5 is at the higher threshold.

As illustrated in FIG. 2, a first read operation can use a center offset value 266 to obtain a center offset sample, a second read operation can use a right offset value 268, and a third read operation can use a left offset value 270.

After the center offset sample, the right offset sample, and the left offset sample are obtained, a first XOR operation is performed between the center offset sample and the right offset sample to obtain a first value and a second XOR operation is performed between the center offset sample and the left offset sample to obtain a second value. A first count operation can count a number of 1s in the first value and a second count operation can count a number of 1s in the second value. The number of 1s in the first value indicates a right difference bit count and the number of 1s in the second value indicates a left difference bit count.

In the depicted embodiment, each PV target can be set in a default state as defined by factory settings. In some cases, all PV targets are adjusted, but in other embodiments, the first PV target and the last PV target can be fixed, allowing the intervening PV targets to be adjusted. For example, with seven PV targets (L1-L7), the L1 and L7 PV targets are fixed and the other PV targets L2 through L6 can receive characterized starting values, leading to faster cRLC and DPT algorithm conversion. Alternatively, the L1, and L7 PV targets are fixed and the other PV targets L2-L6 can be adjusted. These factory settings of the PV targets and read thresholds may produce undesirable BER results before cRLC and DPT operations. It should be noted that in some cases, the first programming distribution 220, corresponding to the first level L0, has a fixed PV target. Similarly, the eighth programming distribution 234, corresponding to the eighth level L7, can have a fixed PV target. Using a dynamic program targeting (DPT) operations, the PV targets of the intervening programming distributions, corresponding to levels L1-L6, can be adjusted. After adjustments, the read sample offset XOR operation can be performed to determine the difference bit counts as described above. By providing difference bit counts to the DPT algorithm, the DPT algorithm can be performed at the memory sub-system as the data does not need to be sent to the ECC decoder to determine the difference error counts (DiffEC) as described below with respect to FIGS. 4A-4B.

The DPT algorithm can be defined as a Net-Zero PV target adjustment mechanism. Net-Zero maintains a constant read threshold level (RWB), but manages adjustments for optimum BER and page type BER matching. This is another way of stating that, the L1 and L7 PV targets are fixed and adjustments to PV targets between L1 and L7 (L2:L6) are managed such that page type BER is continuously matched. The DPT algorithm can equalize the read threshold levels (RWB) and balance the page types (BER). The DPT algorithm performs PV target adjustments in order to balance page type BER for improved BER sigma continuously throughout the life of a memory component or memory system. A cRLC operation is performed to measure and collect valley and difference error count information on the page stack. Since the difference bit counts are can be computed at the memory components, the cRLC operations can be performed at the memory components without sending data to the ECC decoder.

For example, during block programming each of the cRLC page stacks in each of the wordline groups is interrupted and a cRLC is performed until all valleys of the page stack are centered. Conventionally, the cRLC information from each valley can include a Center Bit Error Count (CenterBEC) and a Difference Error Count (DiffEC) and can be passed to the DPT algorithm for determining Program Verify (PV) Target modifications according to the DPT rules. PV target modifications are applied to the next block that is programmed and this process of interrupting and cRLC/DPT continues as DPT converges and finally dithers and then tracks NAND behavior. In one embodiment, the cRLC information from each valley can include a center bit error count (CenterBEC) and a first difference bit error (DBC) and a second DBC. A difference DBC value can also be determined by taking the average or mean of the first DBC and the second DBC and subtracting the CenterBEC.

The DPT can take multiple Erase/Program cycles to converge to stable PV Targets. The same DPT parameters used for TLC products apply to the single pass TLC programming of the memory component. In one embodiment, there are only 5 of the 8 TLC distributions adjusted in the DPT algorithm. The program targets for L2, L3, L4, L5, and L6 move while the program targets for L0, L1, and L7 remain fixed. As shown in FIG. 4B, the PV targets for L2 and L3 are adjusted. The program target offsets are tracked over a number of updates. A program target offset is defined as the difference in position of a PV distribution relative to the default starting value. For example, the PV targets for L2 and L3 first slew to the right by a certain amount (e.g., by about 130 mv) and then stop slewing and start dithering, which is stabilization. The valley after L3 is the L3/4 valley which is the read level threshold 436 (corresponding to the LP Read Level). This movement is caused by equalizing the BER of the LP page to other pages. All PV Targets can stabilized after a number of P/E cycles (e.g., ~40 P/E cycles). It can take some time to stabilize the PV Targets as the algorithm alternates between LP/UP and LP/XP adjustments with a maximum movement of 1 click (e.g., 10 mv). It is possible to characterize these offsets in many die, producing a head start set of offsets, providing BER equalization at time zero.

Figure 3:
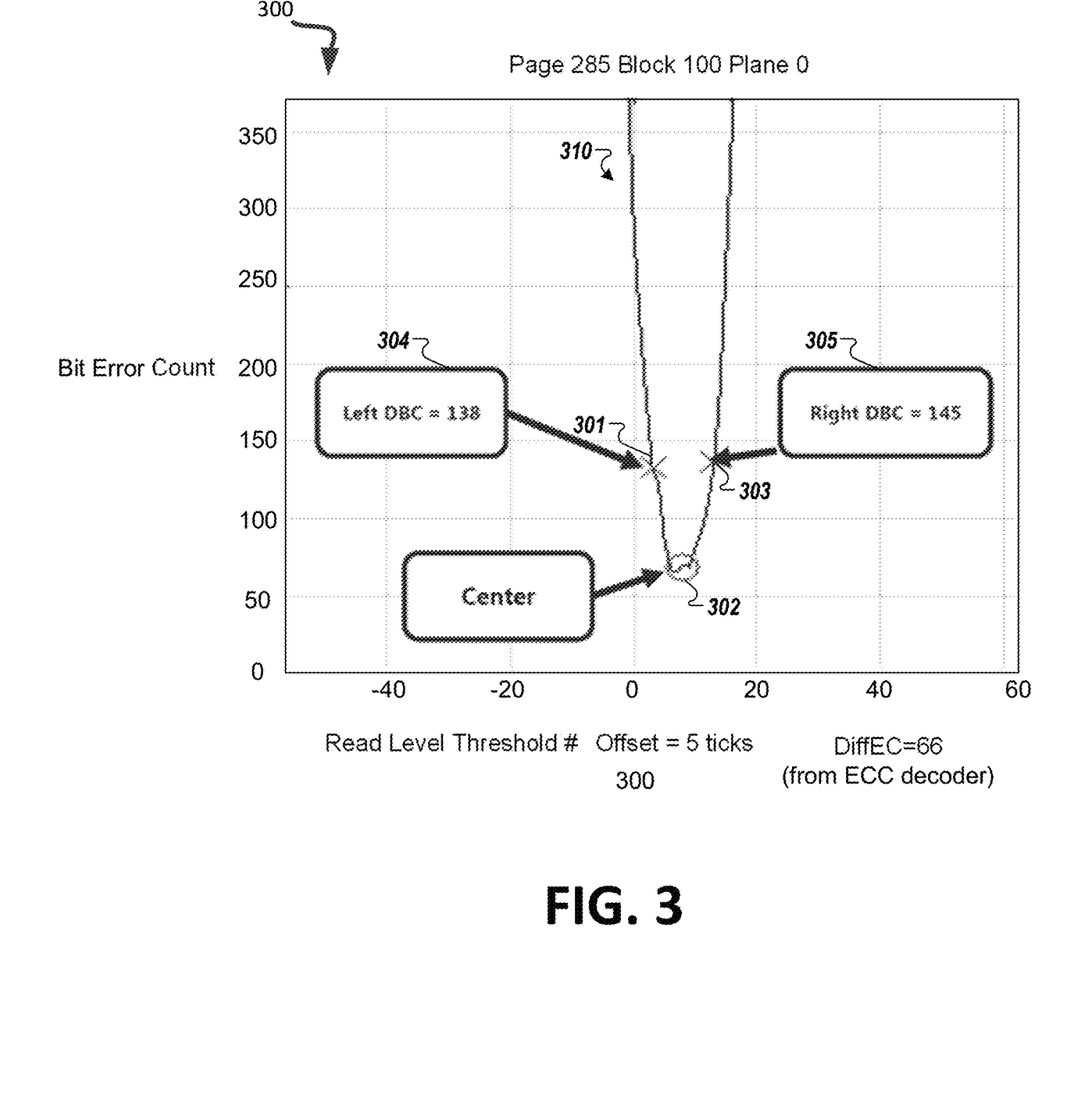
FIG. 3 is a graph illustrating difference bit counts of a read level threshold between two program distributions, in accordance with some embodiments of the present disclosure.

As described herein, BER equalization can be performed with Net-Zero movement. As illustrated in FIG. 3, a center value corresponding the read level threshold of a valley is used to obtain a center sample 302. A left offset value of five clicks (e.g., 50 mV) to the left of the center value can be used to obtain a left offset sample. A right offset value of five clicks (e.g., 50 mV) to the right of the center value can be used to obtain a right offset sample. As illustrated in FIG. 4B, one click (e.g., 10 mv) is given to one level (e.g., labeled as +1) and one click (10 mv) is taken from another level (e.g., labeled as −1). The DPT can adjust both UP and XP relative to LP, resulting in equalization of all three TLC page types. The DPT can equalize the read threshold levels (RWB) and balances the page types (BER). When the DPT is a simple Net-Zero algorithm with feedback, the DPT is incapable of runaway behavior. It should be noted that it is possible to give more RWB to higher distributions if required for undesirable NAND behavior like retention for example. In the system, DPT may be characterized such that DPT results will be close to stabilized at time zero, resulting in faster convergence and the capability to be rapidly dialed in during the system product manufacturing process. In another embodiment, using the right DBC and the left DB calculated from the center, left, and right offset samples, the DPT algorithm can equalize all page types.

In some cases, the DPT cannot update unless cRLC is converged. The cRLC algorithm can converge on the best new read level thresholds between multiple possible simultaneous PV targets in each WLG. The DPT can be converged in manufacturing through an accelerated procedure.

In another embodiment, a system includes a host system, an interconnect, and a memory sub-system coupled to the host over the interconnect. The memory sub-system includes one or more memory devices and a processing device. The processing device performs a read sample offset operation that obtains right sample data, center sample data, and left sample data from data stored in the one or more memory devices. The processing device performs a first XOR operation on the right sample data and the center sample data and a second XOR operation on the left sample data and the center sample data. The processing device counts a first number of ones resulting from the first XOR operation. The first number is a right difference bit count (DBC). The processing device counts a second number of ones resulting from the second XOR operation. The second number is a left DBC. The processing device can perform a subsequent operation using the right DBC and the left DBC. Alternatively, circuitry at the memory component itself performs some or all of the operations of the processing device described above.

In one embodiment, the subsequent operation includes sending the right DBC and the left DBC to the host system over the interconnect. In another embodiment, the host system includes an ECC decoder. Alternatively, the controller of the memory sub-system includes an ECC decoder and the memory components send the right DBC and the left DBC to the controller. The subsequent operation can be a cRLC operation that uses the right DBC and the left DBC without sending the right DBC and the left DBC without sending the right sample data, center sample data, and left sample data to the ECC decoder. In another embodiment, the subsequent operation is any one of the following: a cRLC operation, a read level threshold update operation, a vectorized cRLC operation, a difference DBC (DiffDBC) calculation for a Dynamic Program Targeting (DPT) operation, a DPT operation, an error recovery procedure when data is not decodable by an ECC decoder of the host system (or ECC decoder of the controller of the memory sub-system), a most probable bit decoding operation, a page disparity detection operation, a page-to-page disparity detection operation, a level width temperature compensation operation, or the like.

FIG. 3 is a graph 300 illustrating difference bit counts of a read level threshold between two program distributions in according with some embodiments of the present disclosure. A RSOXOR operation can sample each page type in each wordline group (WLG). Each sample is actually 3 reads; Low-Sample 301, Center-Sample 302, and High-Sample 303. The sample can be similar to samples obtained by a cRLC algorithm that centers or calibrates the read level threshold by balancing the side samples (low-Sample 301 and High-Sample 303). FIG. 3 illustrates a valley 310 between two program distributions of a memory cell. FIG. 3 is an example of a calibrated valley with the center samples 302 being balanced between the side samples 301, 303.

The RSOXOR operation can determine a left DBC 304 by performing a first XOR operation on the Low-Sample 301 and the Center-Sample 302 and counting a first number of 1s that results from the first XOR operation, the first number being the left DBC 304. The RSOXOR operation can determine a right DBC 305 by performing a second XOR operation on the Center-Sample 302 and the High-Sample 303 and counting a second number of 1s that results from the second XOR operation, the second number being the right DBC 305. The RSOXOR operation can further computing a difference, difference bit error (DiffDBC) value by taking the mean of the left DBC 304 and the right DBC 305 and subtracting the Center-Sample 302. This is in contrast to a difference error count (Diff-EC) measurement, which comes from the ECC decoded bit flips and is calculated by taking the mean of the two side samples and subtract out the center sample, such as illustrated and described below with respect to FIGS. 4A-4B.

Referring back to FIG. 3, the RSOXOR operation can result in RSO samples. From the read sample offsets 301-302, the right difference bit counts (DBC) can be computed by counting the number of 1s that result from the XOR operation between the two read samples as set forth by the following example:

RightSampleData=0000001101011000

CenterSampleData=0000001100011001

RightXORCenter=RightSampleData XOR CenterSampleData

RightXORCenter=0000000001000001

RightDifferenceBitCount=2

A similar calculation is performed between the left read and the center sample. From the read sample offsets 302-303, the left DBC can be computed by counting the number of 1s that result from the XOR operation between the two read samples as set forth by the following example:

LeftSampleData=0101101101011000

CenterSampleData=0000001100011001

LeftXORCenter=LeftSampleData XOR CenterSampleData

LeftXORCenter=0101100001000001

LeftDifferenceBitCount=5

Figure 4A:
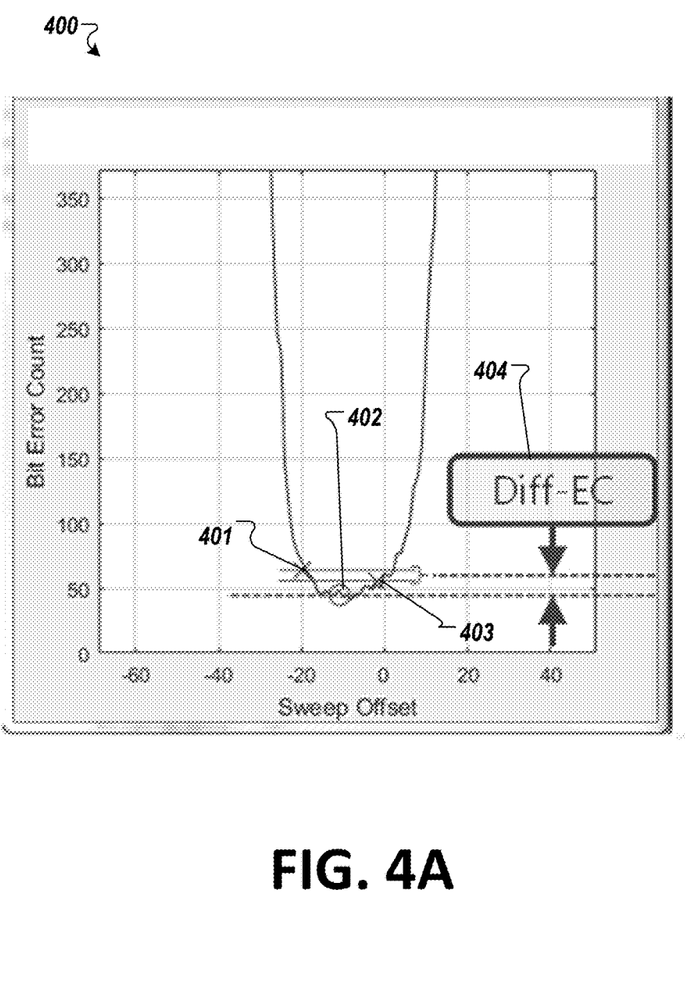
FIGS. 4A-4B illustrate difference error counts of two read level thresholds between two program distributions in accordance with some conventional systems.
Figure 4B:
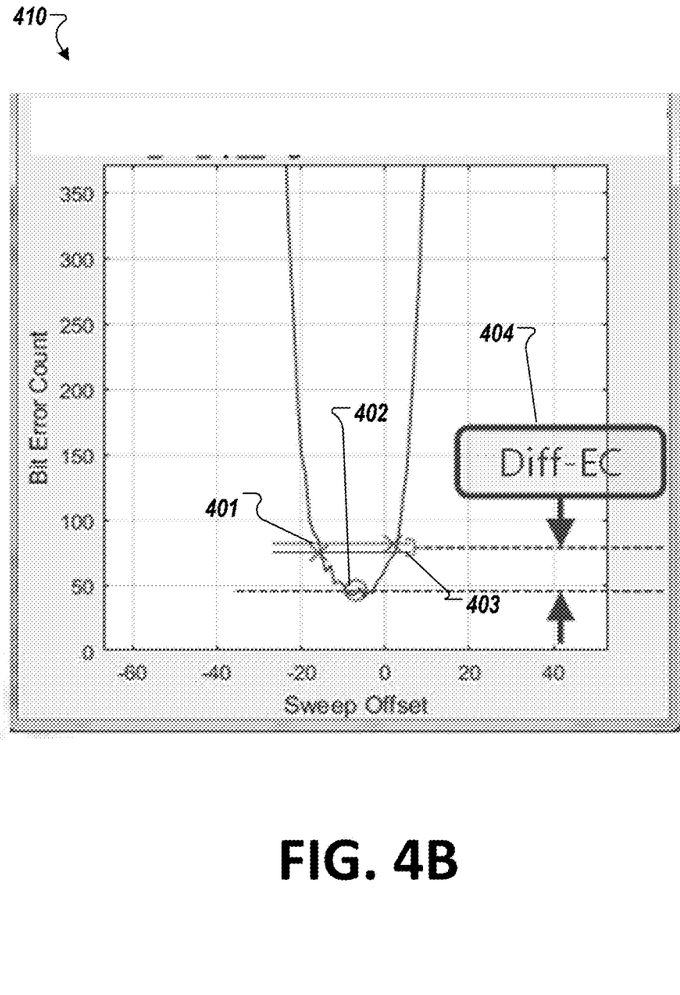

FIGS. 4A-4B illustrate difference error counts of two read level thresholds between two program distributions in accordance with some conventional systems. A continuous read level calibration (cRLC) algorithm can sample each page type in each WLG. Each sample is actually 3 reads; Low-Sample 401, Center-Sample 402, and High-Sample 403. The cRLC algorithm centers or calibrates, by balancing the side samples (low-Sample 401 and High-Sample 403. FIG. 4A illustrates a valley between two program distributions of a memory cell and FIG. 4B illustrates a valley between two other program distributions of the memory cell. FIGS. 4A-4B are examples of calibrated valleys with the center samples 402 being balanced between the side samples. FIG. 4A demonstrates wide valley behavior 410 and FIG. 4B demonstrates narrow valley behavior 420.

The Center-Samples 402 are used as the feedback metrics by a DPT algorithm to equalize the LP/UP/XP error rates by moving PV targets slightly. But, Center-Samples 402 may not be enough to equalize the BER between the page types (LP/UP/XP). For each page type, the valley depth must also have a reasonable match. Valley depth is closely related to Read Window Budget (RWB). The valley depth is a deepest point in a bit error rate (BER) sweep of a page type. The RWB is the space between all of the valleys at some error count (in volts) and is an indication of how much margin a part has to read data without errors. The default PV targets can determine the depths of the valleys between the program distributions, the depths being directly related to the RWB of each valley. To determine the valley depths or RWBs of a program distribution, the cRLC algorithm can determine a difference error count (Diff-EC) measurement 404. The Diff-EC measurement 404 can be used to identify the valley depth or the relative RWB. The Diff-EC measurement 404 can be the mean of the two side samples 401, 403 minus the center value 402. So, the DPT algorithm can perform BER leveling by moving PV targets to match not only the error counts between page types, but also match the RWB by valley within each page type. It should be noted that the ECs of the Center-Samples 402 match when multiple valley pages are being measured (UP & XP). Despite the Center-Sample ECs matchings, the valley depth (i.e., or RWB) can be dramatically different even within these multi valley page types (UP & XP). To determine which valley is the shallowest or deepest, the measure of Diff-EC can be reliably used; the higher the Diff-EC measurement 404, the narrower the valley or the RWB is smaller. It is important that the offsets between the Low-Sample 401, Center-Sample 402, and High-Sample 403 are equal. Also, the Diff-EC measurement 404 should be calibrated so that the Diff-EC between shallow and deep valleys is easy to distinguish.

As illustrated, the example of FIG. 4A has a lower Diff-EC measurement 404 than the example of FIG. 4B, which means the program distributions have a wider RWB and is less-needy. The terms More-Needy and Less-Needy refers to the relative RWB of valleys which apply to the same page type within a WLG. In other words, the Most-Needy valley for a page type will be the one that is dominating the Error Count or causing more BER loss than any other valley. The Diff-EC measurement can be used to determine More-Needy vs. Less-Needy valleys, including the order of Needy-Ness (most to least needy). When a TLC page stack page BER is balanced, the LP (L3/L4) will have the lowest RWB, the UP (L1/L2 and L5/L6) will be a bit higher and should be about equal, and XP (L2/L3, L4/L5, and L6/L7, notice that L0/L1 is ignored because it is special) will be the highest RWB. It should be noted that a balanced BER causes the RWB to gravitate to the definition described above, which occurs as a natural byproduct of the DPT algorithm.

Figure 5:
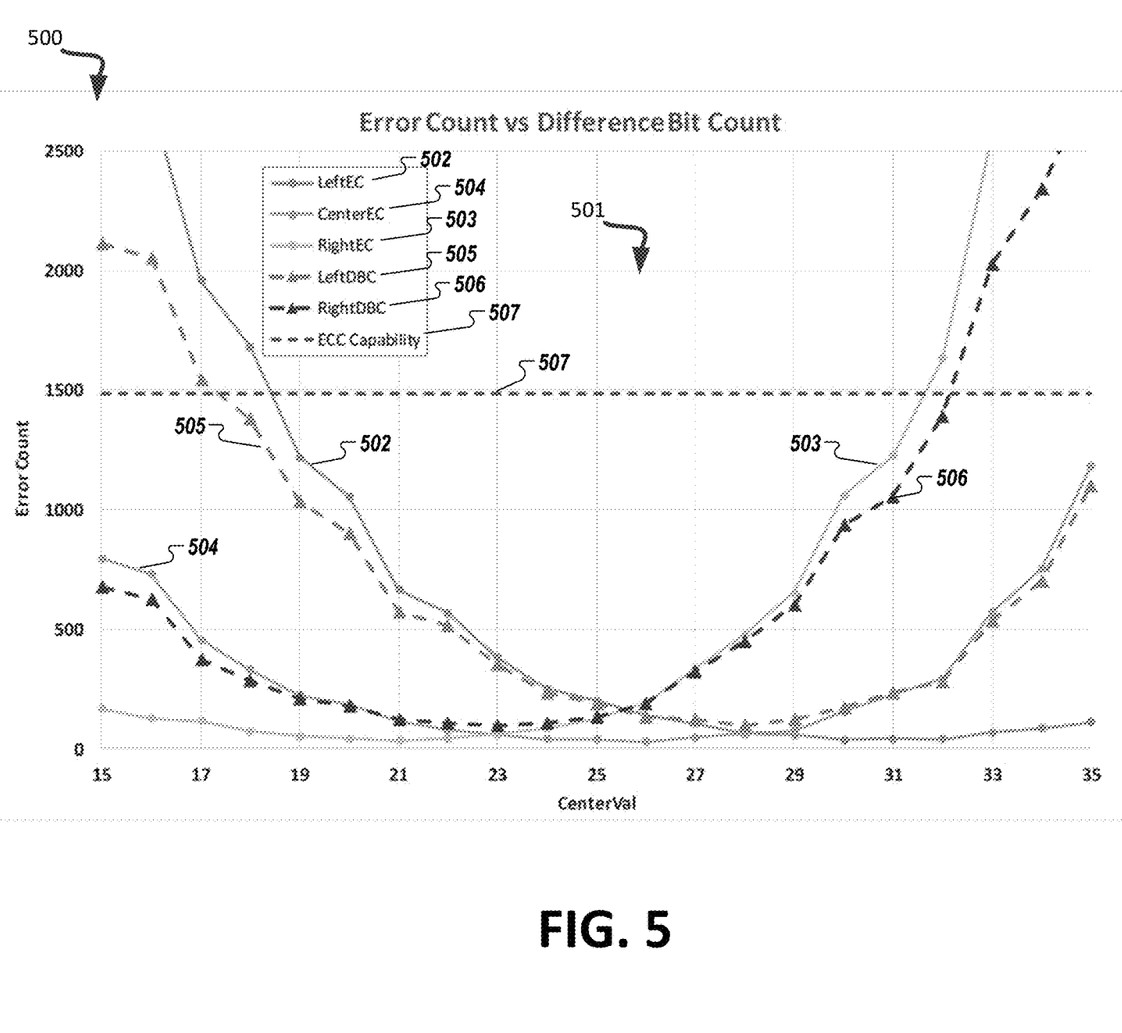
FIG. 5 is a graph illustrating a read sample offset sweep for comparing error counts and difference bit counts, in accordance with some embodiments of the present disclosure.

FIG. 5 is a graph 500 illustrating a read sample offset sweep for comparing error counts and difference bit counts, in accordance with some embodiments of the present disclosure. As illustrated in example of FIG. 5, a valley 501 is centered at a center offset of about 25. This can be determined and/or verified by finding a lowest error count (EC) as determined by an ECC decoder. At each offset in the read sample offset sweep, a left EC 502, a right EC 503, a center EC 504, a left DBC 505, and a right DBC 506 are measured.

As illustrated in FIG. 5, the left EC 502 and the left DBC 505 are comparable and the right EC 503 and the right DBC 506 are comparable. From the left DBC 505 and the right DBC 506, the center of the valley 501 can be found in a similar manner of the left EC 502 and right EC 503, but without use of an ECC decoder.

It should also be noted that an ECC decoder has an ECC capability 507. As illustrated in FIG. 5, the center of the valley 501 can be found even when the error counts exceed the ECC capability 507.

Figure 6:
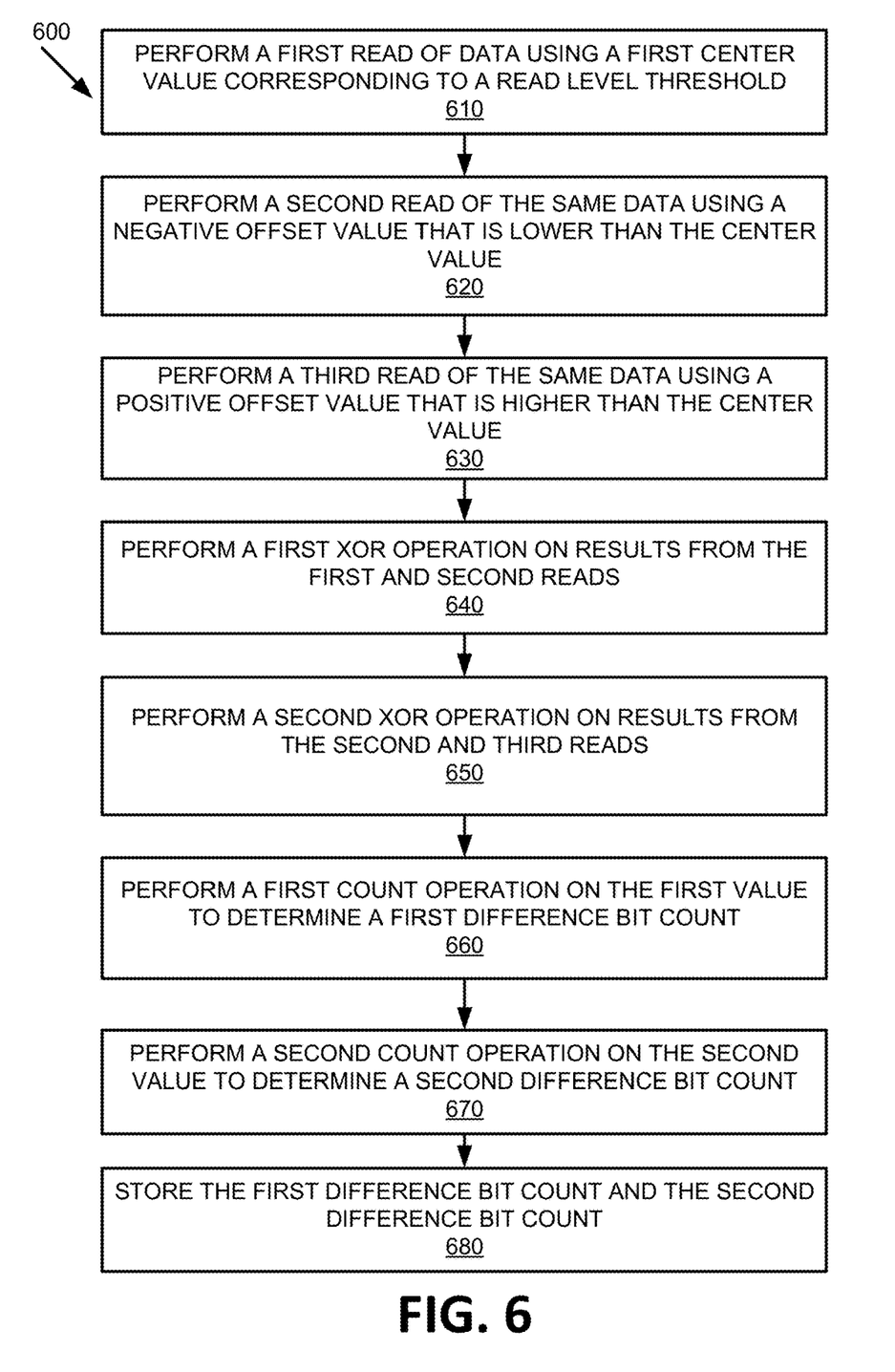
FIG. 6 is a flow diagram of an example method to perform a read sample offset XOR operation in accordance with some embodiments of the present disclosure.

FIG. 6 is a flow diagram of an example method 600 to perform a read sample offset XOR operation in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the logic based read sample offset component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 610, the processing device performs a first read of data from one or more memory devices using a first center value corresponding to a first read level threshold. At operation 620, the processing device performs a second read of the same data using a negative offset value that is lower than the center value. At operation 630, the processing device performs a third read of the same data using a positive offset value that is higher than the center value. At operation 640, the processing device performs a first XOR operation on results from the first read and results from the second read to obtain a first value. At operation 650, the processing device performs a second XOR operation on the results from the first read and results of the third read to obtain a second value. At operation 660, the processing device performs a first count operation on the first value to determine a first difference bit count. At operation 670, the processing device performs a second count operation on the second value to determine a second difference bit count. At operation 680, the processing device stores the first difference bit count and the second difference bit count.

In a further embodiment, the processing logic is part of a controller of the memory sub-system and the controller performs the first XOR operation and the second XOR operation. Similarly, the processing logic of the controller performs the first count operation and the second count operation. The processing logic of the controller outputs the first difference bit count and the second difference bit count to a host system coupled to the memory sub-system. In another embodiment, the processing logic is part of a memory component of the memory sub-system and the processing logic performs the first XOR operation and the second XOR operation. The processing logic in the memory component can also perform the first count operation and the second count operation. The processing logic in the memory component can output the first difference bit count and the second difference bit count to the controller of the memory sub-system.

In another embodiment, the processing logic of the memory sub-system performs the first XOR operation and the second XOR operation, but processing logic of the host system performs the first count operation and the second count operation. The processing logic of the memory sub-system outputs the results of the first XOR operation and the results of the second XOR operation to the host system to perform the first count operation and the second operation.

In another embodiment, the processing logic is part of the memory component and performs some or all of the first XOR operation, the second XOR operation, the first count operation, and the second count operation.

In another embodiment, the processing logic is part of a host system and performs some or all of the first XOR operation, the second XOR operation, the first count operation, and the second count operation.

In another embodiment, the processing logic performs the first read as part of a center read operation of a page using multiple read level thresholds for a specified page type. The second read can be part of a first offset read operation of the page where the negative offset value is used for all of the multiple read level thresholds for the specified page type. The third read can be part of a second offset read operation of the page where the positive offset value is used for all of the multiple read level thresholds for the specified page type. The processing logic can perform a third XOR operation on results from the center read operation and results from the first offset read operation to obtain a third value and a second XOR operation on the results from the center read operation and result from the second offset read operation to obtain a fourth value. The processing logic performs a third count operation on the third value to determine a third difference bit count and a fourth count operation on the fourth value to determine a fourth difference bit count. The third difference bit count and the fourth difference bit count represent bit changes from a sum of all of the multiple read level thresholds for the specified page type.

Figure 7:
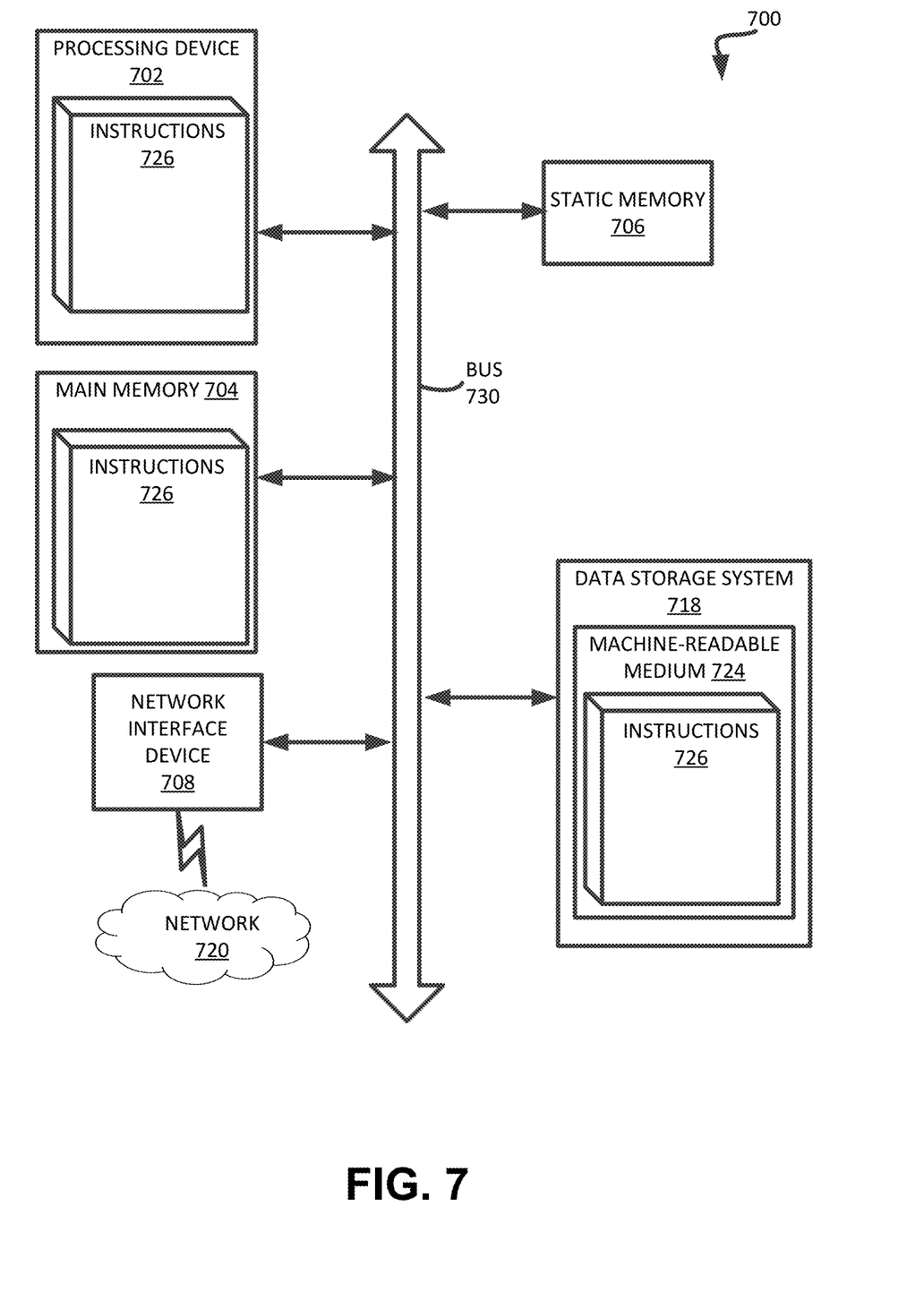
FIG. 7 is a block diagram of an example computer system in which embodiments of the present disclosure may operate.

FIG. 7 illustrates an example machine of a computer system 700 within which a set of instructions, for causing the machine to perform any one or more of the methodologies discussed herein, can be executed. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the logic based read sample offset component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 700 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage system 718, and/or main memory 704 can correspond to the memory sub-system 110 of FIG. 1.

In one embodiment, the instructions 726 include instructions to implement functionality corresponding to a caching component (e.g., the logic based read sample offset component 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
   one or more memory devices; and
   a processing device coupled to the one or more memory devices, wherein the processing device is to:
   perform a first exclusive-or (XOR) operation on results from a center read sample and results from a left read sample to obtain a first value;
   perform a second XOR operation on the results from the center read sample and results of a right read sample to obtain a second value;
   perform a first count operation on the first value to determine a first difference bit count;
   perform a second count operation on the second value to determine a second difference bit count; and
   determine, based on the first difference bit count and the second difference bit count, a difference bit count.

2. The memory system of claim 1, wherein the center read sample corresponds to data read from the one or more memory devices using a center value corresponds to a first read level threshold, the left read sample corresponds to data read using a negative offset value that is lower than the center value, and right read sample corresponds to data read using a positive offset value that is higher than the center value.

3. The memory system of claim 1, wherein the first count operation counts a number of ones in the first value resulting from the first XOR operation, wherein the number of ones in the first value indicates a number of bits that have changed between the center read sample and the left read sample, wherein the second count operation counts a number of ones in the second value resulting from the second XOR operation, wherein the number of ones in the second value indicates a number of bits that have changed between the center read sample and the right read sample.

4. The memory system of claim 1, wherein the processing device comprises a logic circuit to perform the first XOR operation and the second XOR operation.

5. The memory system of claim 1, wherein the processing device comprises:
   a first logic circuit to perform the first XOR operation; and
   a second logic circuit to perform the second XOR operation.

6. The memory system of claim 1, wherein the processing device is a NAND controller and the one or more memory devices are NAND memory devices.

7. The memory system of claim 6, wherein the NAND controller performs a continuous read level calibration (cRLC) operation on the one or more memory device using the first difference bit count and the second difference count without sending the results from the center read sample, the left read sample, and the right read sample to an Error Correction Code (ECC) decoder.

8. The memory system of claim 7, wherein the first difference bit count exceeds a correction capability of the ECC decoder.

9. The memory system of claim 2, wherein the processing device is further to:
   perform a third XOR operation on results from a second center read sample and results from a second left read sample to obtain a third value;
   perform a fourth XOR operation on the results from the second center read sample and results from a second right read sample to obtain a fourth value;
   perform a third count operation on the third value to determine a third difference bit count;
   perform a fourth count operation on the fourth value to determine a fourth difference bit count; and
   determine, based on the third difference bit count and the fourth difference bit count, a second difference bit count.

10. The memory system of claim 9, wherein the second center read sample corresponds to a second data read from the one or more memory devices using a second center value corresponding to a second read level threshold, the second left read sample corresponds to the second data read using a second negative offset that is lower than the second center value, and the second right read sample corresponds to the second data read using a second positive offset that is higher than the second center value.

11. The memory system of claim 9, wherein the center read sample and the second center read sample are performed concurrently, wherein the left read sample and the second left read sample are performed concurrently, and wherein the right read sample and the second right read sample are performed concurrently.

12. The memory system of claim 10, wherein the first read level threshold and the second read level threshold correspond to a same page type.

13. The memory system of claim 1, wherein the processing device resides in the one or more memory devices, and wherein the processing device is further to send the first difference bit count and the second difference bit count to a controller of the memory system.

14. The memory system of claim 2, wherein the processing device uses a read sample offset (RSO) mask register to mask one or more read level thresholds of a page type and disable the first read level threshold, wherein the center read sample, the left read sample, and the right read sample are part of a RSO page read from a page that provides three-strobe results with bit error rate (BER) differences limited to the first read level threshold.

15. The memory system of claim 2, wherein the processing device uses a read sample offset (RSO) mask register to mask one or more read level thresholds of a page type and disable the first read level threshold and a second read level threshold, wherein the center read sample, the left read sample, and the right read sample are part of a RSO page read from a page that provides three-strobe results bit error rate (BER) differences limited to the first read level threshold and the second read level threshold.

16. A system comprising:
a host system;
an interconnect; and
a memory sub-system coupled to the host system over the interconnect, wherein the memory sub-system comprises one or more memory devices and a processing device, wherein the processing device is to:
perform a first XOR operation on a right sample data from data stored in the one or more memory devices and a center sample data from data stored in the one or more memory devices;
perform a second XOR operation on a left sample data from data stored in the one or more memory devices and the center sample data;
count a first number of ones resulting from the first XOR operation, wherein the first number is a right difference bit count (DBC),
count a second number of ones resulting from the second XOR operation, wherein the second number is a left DBC;
determine, based on the right DBC and the left DBC, a difference bit count; and
perform a subsequent operation using the difference bit count.

17. The system of claim 16, wherein the memory sub-system further comprises a controller coupled to the one or more memory devices, wherein the processing device resides in the one or more memory devices, and wherein the subsequent operation comprises sending the right DBC and the left DBC to the controller.

18. The system of claim 16, wherein the memory sub-system further comprises a controller coupled to the one or more memory devices, wherein the processing device resides in the one or more memory devices, wherein the controller comprises an Error Correction Code (ECC) decoder, and wherein the subsequent operation is a continuous read level calibration (cRLC) operation using the right DBC and the left DBC without sending the right sample data, center sample data, and left sample data to the ECC decoder.

19. The system of claim 16, wherein the subsequent operation is at least one of:
a continuous read level calibration (cRLC) operation;
a read level threshold update;
a vectorized cRLC operation;
a difference DBC (DiffDBC) calculation for a Dynamic Program Targeting (DPT) operation;
an error recovery procedure when data is not decodable by an Error Correction Code (ECC) decoder;
a most probable bit decoding operation;
a page disparity detection operation;
a page-to-page disparity detection operation; or
a level width temperature compensation operation.

20. A method comprising:
performing a first XOR operation on results from a center read sample and results from a left read sample to obtain a first value;
performing a second XOR operation on the results from the center read sample and results of a right read sample to obtain a second value;
performing a first count operation on the first value to determine a first difference bit count;
performing a second count operation on the second value to determine a second difference bit count; and
determining, based on the first difference bit count and the second difference bit count, a difference bit count.

21. The method of claim 20, wherein the center read sample corresponds to data read from one or more memory devices using a first center value corresponds to a first read level threshold, the left read sample corresponds to data read using a negative offset value that is lower than the center value, and right read sample corresponds to data read using a positive offset value that is higher than the center value.

22. The method of claim 20, wherein performing the first XOR operation and the second XOR operation comprises performing the first XOR operation and the second XOR operation by a processing device of a memory sub-system, wherein performing the first count operation and the second count operation comprises performing the first count operation and the second count operation by the processing device of the memory system, and wherein the method further comprises outputting the difference bit count to a host system coupled to the memory sub-system.

23. The method of claim 20, wherein performing the first XOR operation and the second XOR operation comprises performing the first XOR operation and the second XOR operation by a processing device of a memory sub-system, and wherein performing the first count operation and the second count operation comprises performing the first count operation and the second count operation by a host system coupled to the memory sub-system.

24. The method of claim 21, wherein performing the center read sample is part of a center read operation of a page using a plurality of read level thresholds for a specified page type, wherein performing the left read sample is part of a first offset read operation of the page where the negative offset value is used for all of the plurality of read level thresholds for the specified page type, wherein performing the right read sample is part of a second offset read operation of the page where the positive offset value is used for all of the plurality of read level thresholds for the specified page type, wherein the method further comprises:
performing a third XOR operation on results from the center read operation and results from the first offset read operation to obtain a third value;
performing a second XOR operation on the results from the center read operation and result from the second offset read operation to obtain a fourth value;
performing a third count operation on the third value to determine a third difference bit count; and
performing a fourth count operation on the fourth value to determine a fourth difference bit count, wherein the third difference bit count and the fourth difference bit count represent bit changes from a sum of all of the plurality of read level thresholds for the specified page type.

* * * * *